United States Patent [19]

Adam et al.

[11] Patent Number: 5,212,312
[45] Date of Patent: May 18, 1993

[54] VATTABLE AND NON-VATTABLE QUINOID DYES

[75] Inventors: Jean-Marie Adam, Saint-Louis, France; Athanassios Tzikas, Pratteln, Switzerland

[73] Assignee: Ciba-Geigy AG, Basle, Switzerland

[21] Appl. No.: 912,174

[22] Filed: Sep. 22, 1986

Related U.S. Application Data

[63] Continuation of Ser. No. 628,963, Jul. 11, 1984, abandoned, which is a continuation of Ser. No. 329,858, Dec. 11, 1981, abandoned.

[30] Foreign Application Priority Data

Dec. 23, 1980 [CH] Switzerland .................. 9530/80

[51] Int. Cl.⁵ ................. C07D 487/06; C07D 491/00
[52] U.S. Cl. ........................... 546/32; 546/28; 546/37; 546/52; 546/66; 546/270; 546/273; 546/274; 546/285; 546/486; 544/248; 544/351; 548/418; 548/474; 549/348; 564/185
[58] Field of Search ............... 546/30, 37, 52, 66, 546/337, 270, 285, 32, 273, 274; 544/351, 248; 548/418, 486

[56] References Cited

U.S. PATENT DOCUMENTS

| | | | |
|---|---|---|---|
| 1,887,995 | 11/1932 | Conzetti | 546/337 |
| 2,176,896 | 10/1939 | Epstein et al. | 546/337 |
| 2,219,280 | 10/1940 | Graenacher et al. | 546/337 |
| 3,732,218 | 5/1973 | Gerd et al. | 544/351 |
| 3,819,632 | 6/1974 | Burdeska et al. | 546/52 |
| 4,393,005 | 7/1983 | Patsch et al. | 540/123 |
| 4,395,545 | 7/1983 | Adam et al. | 544/74 |
| 4,472,581 | 9/1984 | Patsch et al. | 546/101 |
| 4,491,662 | 1/1985 | Patsch et al. | 546/101 |

FOREIGN PATENT DOCUMENTS

| | | |
|---|---|---|
| 1134817 | 11/1982 | Canada . |
| 1444730 | 11/1968 | Fed. Rep. of Germany . |
| 1644534 | 11/1969 | Fed. Rep. of Germany . |
| 2616486 | 11/1977 | Fed. Rep. of Germany . |
| 3111200 | 9/1982 | Fed. Rep. of Germany . |
| 1396903 | 3/1965 | France . |
| 1072901 | 6/1967 | United Kingdom . |

OTHER PUBLICATIONS

*Chemical Abstracts*, vol 88, (1978) No. 75307f eq Crevman 2616486.
Adam, CA97-199539p.
Noller, Chemistry of Organic Compounds, 3rd Ed., Saunders 1965, pp. 756-760.
Adam, CA 94-48834t.
Adam, CA94-4946b.
Adam, CA 94-17122e.

*Primary Examiner*—Cecilia Shen
*Attorney, Agent, or Firm*—Wenderoth, Lind & Ponack

[57] ABSTRACT

Dyes of the formula $$[F]\left[\begin{array}{c}CH-N-C-R_1\\ | \ | \ \|\\ R_3 \ R_2 \ O\end{array}\right]_n$$

in which F is the radical of an indigoid dye, of a benzothioxanthene or of an aromatic dye which contains at least 4 alicyclic and/or heterocyclic, fused six-membered rings and at least two ring keto groups and is not water-soluble, $R_1$ is a substituted or unsubstituted $C_{1-4}$-alkyl radical, a substituted or unsubstituted cycloalkyl radical, a substituted or unsubstituted aryl radical or a radical of the formula $$-A-Q$$

where A is a substituted or unsubstituted $C_{1-4}$-alkylene radical and Q is a basic radical, which may be quaternised, and $R_2$ is hydrogen or a substituted or unsubstituted $C_{1-4}$-alkyl radical, or in which $R_1$ and $R_2$ together with the $$-N-C-\\ \|\\ O$$

group are a phthalimide radical, and $R_3$ is hydrogen, a substituted or unsubstituted $C_{1-4}$-alkyl radical, a substituted or unsubstituted aryl radical, a $C_{1-4}$-alkoxycarbonyl radical or a N,N-di-$C_{1-4}$-alkylcarboxamide radical and n is 1, 2, 3 or 4.

The novel dyes are suitable as vat dyes for dyeing natural or regenerated cellulose and as cationic dyes for dyeing paper.

9 Claims, No Drawings

VATTABLE AND NON-VATTABLE QUINOID DYES

This application is a continuation, of now abandoned application Ser. No. 628,963, filed Jul. 11, 1984 which application is a continuation of now abandoned application Ser. No. 329,858, filed Dec. 11, 1981.

The invention relates to dyes of the formula

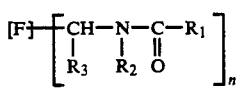 (1)

in which F is the radical of an indigoid dye, of a benzothioxanthene or of an aromatic dye which contains at least 4 alicyclic and/or heterocyclic, fused six-membered rings and at least two ring keto groups and is not water-soluble, $R_1$ is a substituted or unsubstituted $C_{1-4}$-alkyl radical, a substituted or unsubstituted cycloalkyl radical, a substituted or unsubstituted aryl radical or a radical of the formula $$-A-Q \quad (2)$$

where A is a substituted or unsubstituted $C_{1-4}$-alkylene radical and Q is a basic radical, which may be quaternised, and $R_2$ is hydrogen or a substituted or unsubstituted $C_{1-4}$-alkyl radical, or in which $R_1$ and $R_2$ together with the

group are a phthalimide radical, and $R_3$ is hydrogen, a substituted or unsubstituted $C_{1-4}$-alkyl radical, a substituted or unsubstituted aryl radical, a $C_{1-4}$-alkoxycarbonyl radical or a N,N-di-$C_{1-4}$-alkylcarboxamide radical and n is 1, 2, 3 or 4.

The dye radicals F are vattable or non-vattable quinoid dye radicals, for example radicals of indanthrone, flavanthrone, anthraquinoneacridone, anthraquinonethioxanthone, thiophenebenzanthrone, anthraquinonecarbazole, pyranthrone, anthanthrone, dibenzopyrenequinone, isodibenzopyrenequinone, dibenzanthrone, isodibenzanthrone, perylenetetracarboxylic acid imide, naphthoylenebenzimidazole or naphthoquinone dyes, indigoid dyes or perinone or benzothioxanthene dyes.

The dye radicals can be substituted or unsubstituted. Examples of such substituents are halogen atoms, in particular chlorine, fluorine or bromine, and alkyl, alkoxy, aryl, aryloxy, aralkyl, aralkoxy, arylamino, alkylthio, arylthio, alkylamino, hydroxy, cyano and thiocyano groups. In this specification, alkyl is to be understood as meaning, in particular, radicals with 1 to 4 carbon atoms, aryl is to be understood as meaning, in particular, radicals such as phenyl, tolyl, chlorophenyl, methoxyphenyl or naphthyl radicals, and aralkyl is to be understood as meaning, in particular, the benzyl radical. The acyl and acylamino group are also particularly important substituents. The term acyl includes, in particular, radicals of aromatic carboxylic or sulfonic acids, in particular those of the benzene series or lower, i.e. containing 1 to 4 carbon atoms, alkanoyl or alkylsulfonyl radicals, for example the acetyl, benzoyl, p-chlorobenzoyl, p-phenylbenzoyl, benzenesulfonyl or p-toluenesulfonyl radical, as well as lower alkoxycarbonyl radicals and sulfonic acid amide or carboxylic acid amide groups, the nitrogen atom of which can be substituted by alkyl or aryl radicals, for example the ethoxycarbonyl, carbamyl or sulfamyl radical.

Dye radicals which are not water-soluble are to be understood as meaning those which are completely or largely free from anionic groups which render them water-soluble, for example carboxylic acid groups, sulfonic acid groups and sulfuric acid ester groups.

Alkyl radicals $R_1$, $R_2$ and $R_3$ are, independently of one another, straight-chain or branched alkyl radicals, which can also be substituted, for example by halogen, such as fluorine, chlorine or bromine, or alkoxy, such as methoxy or ethoxy. Examples of $R_1$, $R_2$ and $R_3$ are: methyl, ethyl, propyl, isopropyl, butyl, sec.-butyl, isobutyl, tert.-butyl, chloromethyl and trichloromethyl.

A cycloalkyl radical $R_1$ is, for example, a cyclopentyl, cyclohexyl or cycloheptyl radical, which can also be substituted, for example by halogen, such as fluorine, chlorine or bromine, alkyl, such as methyl or ethyl, or alkoxy, such as methoxy or ethoxy. In particular, a cycloalkyl radical $R_1$ is a cyclohexyl radical.

Aryl radicals $R_1$ and $R_3$ are, independently of one another, aryl radicals of the benzene or naphthalene series or of the heterocyclic series, which can also be substituted, for example by halogen, such as fluorine, chlorine or bromine, alkyl, such as methyl or ethyl, alkoxy, such as methoxy or ethoxy, or the nitro group. Examples of $R_1$ and $R_3$ are: phenyl, chlorophenyl, dichlorophenyl, nitrophenyl, naphthyl and pyridyl. In particular, an aryl radical $R_1$ or $R_3$ is a phenyl or dichlorophenyl radical.

An alkoxycarbonyl or N,N-dialkylcarboxamide radical $R_3$ is a radical which contains a methyl, ethyl, propyl or butyl radical in the alkyl moiety.

A preferred sub-group of the dyes of the formula (1) are dyes in which $R_1$ is the radical of the formula (2), in which A and Q are as defined under formula (2), and F, $R_2$, $R_3$ and n are as defined under formula (1).

An alkylene radical A is, for example: a methylene, ethylene, propylene or butylene radical.

Particularly preferred dyes of the formula (1) are those in which $R_1$ is a radical of the formula (2), in which A is as defined under formula (2) and Q is a radical of the formula

 (3)

 (4)

 (5)

 (6)

in which, in the formulae (3) to (6), $T_1$, $T_2$, $T_3$, $T_4$ and $T_8$ independently of one another are $C_{1-4}$-alkyl radicals which are unsubstituted or substituted by hydroxyl, $T_5$ and $T_6$ independently of one another are $C_{1-4}$-alkyl radicals, $T_7$ is hydrogen, a $C_{1-4}$-alkyl radical which is unsubstituted or substituted by hydroxyl, a cyclohexyl radical which is unsubstituted or mono-, di- or tri-substituted by methyl groups, or a phenyl radical, or in which the radicals $T_1$ and $T_2$, $T_3$ and $T_4$, or $T_7$ and $T_8$, together with the nitrogen atom, are a pyrrolidine, piperidine, morpholine or piperazine ring, or in which the radicals $T_3$, $T_4$ and $T_5$, together with the nitrogen atom, are a pyridinium ring or a radical of the formula

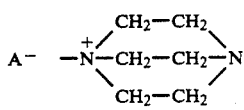
(7)

and $A^-$ in the formulae (3) to (5) and (7) is an organic or inorganic anion, and F, $R_2$, $R_3$ and n are as defined under formula (1).

Alkyl radicals $T_1$, $T_2$, $T_3$, $T_4$, $T_7$ and $T_8$ are, independently of one another, straight-chain or branched alkyl radicals, which can also be substituted by hydroxyl. Examples are: methyl, ethyl, propyl, isopropyl, butyl, sec.-butyl, isobutyl, tert.-butyl and β-hydroxybutyl. An alkyl radical $T_5$ or $T_6$ is one of the unsubstituted alkyl radicals described above.

An organic or inorganic anion $A^-$ in the formulae (3), (4), (5) and (7) is, for example: chloride, bromide, iodide or a sulfate, disulfate, methylsulfate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleate, malate, acetate, propionate, lactate, succinate, chloroacetate, tartrate or methanesulfonate ion or the benzoate ion or a complex anion, for example an ion of a zinc chloride double salt.

Dyes of the formula (1) in which $R_1$ is a radical of the formula (2) in which A is as defined under formula (2), Q is a radical of the formula (3), (4), (5), (6) or (7), $R_2$ is hydrogen or a $C_{1-4}$-alkyl radical which is unsubstituted or substituted by chlorine, $R_3$ is hydrogen, a $C_{1-4}$-alkyl radical which is unsubstituted or substituted by chlorine, or a substituted or unsubstituted phenyl radical, and F and n are as defined under formula (1), are also particularly preferred.

Dyes of the formula (1) which are especially preferred are those in which F is a radical of a dibenzanthrone, isodibenzanthrone, 16,17-ethylenedioxydibenzanthrone, 2,2'-dibenzanthronyl, 2,2'-bisindolindigo, 2,2'-bisthionaphtheneindigo, cis- or trans-naphthoylenebenzimidazole, benzothioxanthene, N,N'-di-p-tolyl-perylenetetracarboxylic acid diimide, N,N'-di-p-phenethoxynaphthalene-1,4,5,8-tetracarboxylic acid diimide, 5,5'-bisnaphthyl-1,1',8,8'-tetracarboxylic acid-dibenzimidazole, 5,5'-bisnaphthyl-1,1',8,8'-tetracarboxylic acid-6",6'''-dimethyldibenzimidazole, 5,5'-bisnaphthyl-1,1',8,8'-tetracarboxylic acid-5",5''', 6",6'''-tetramethoxydibenzimidazole or 16,17-methylenedioxydibenzanthrone dye, or a radical of the formula

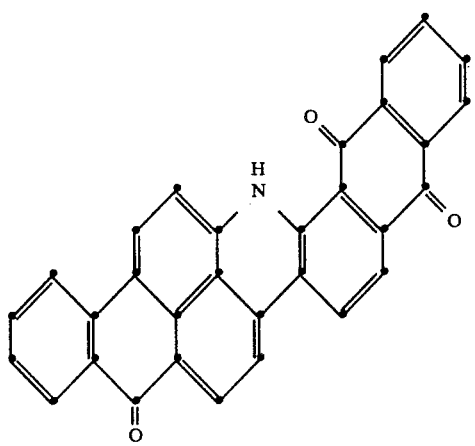
(8)

or

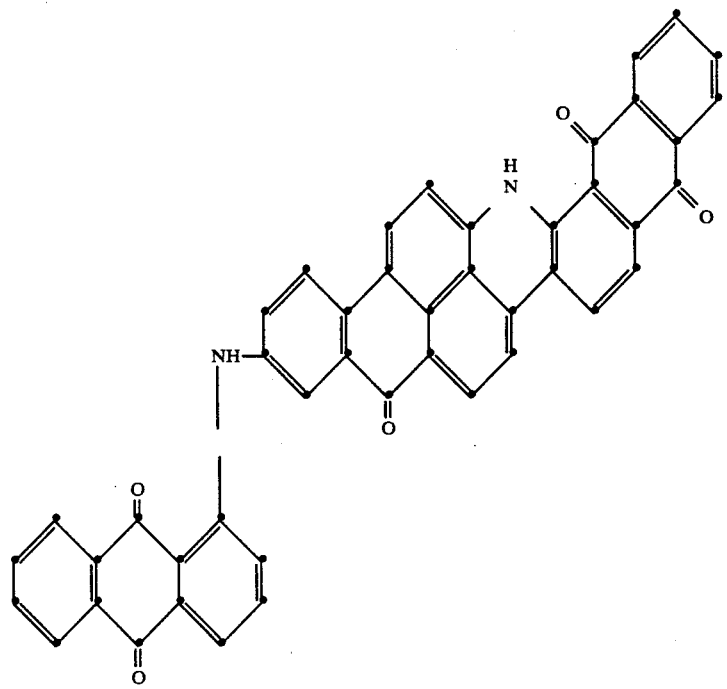
(9)
$R_1$ is a radical of the formula (2), in which A is methylene and Q is a pyridinium chloride radical, $R_2$ and $R_3$ are hydrogen and n is 1 or 2.
Valuable representatives of these preferred dyes are the dyes of the formulae
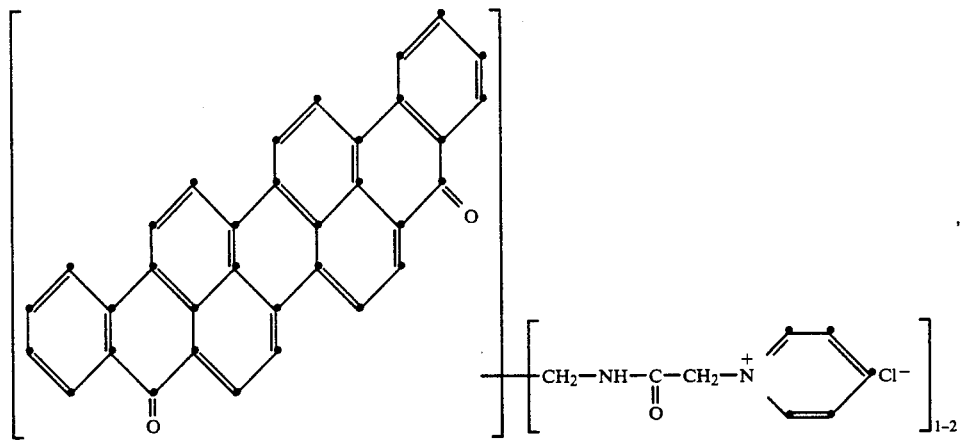
(10)
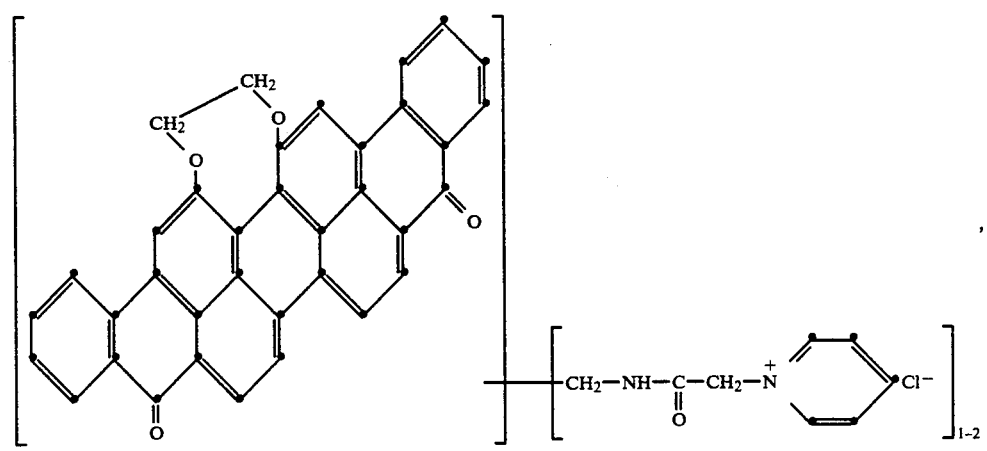
(11)

-continued
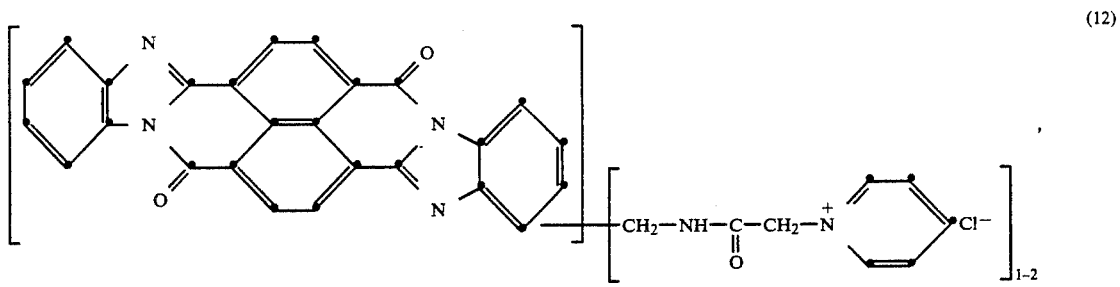
(12)
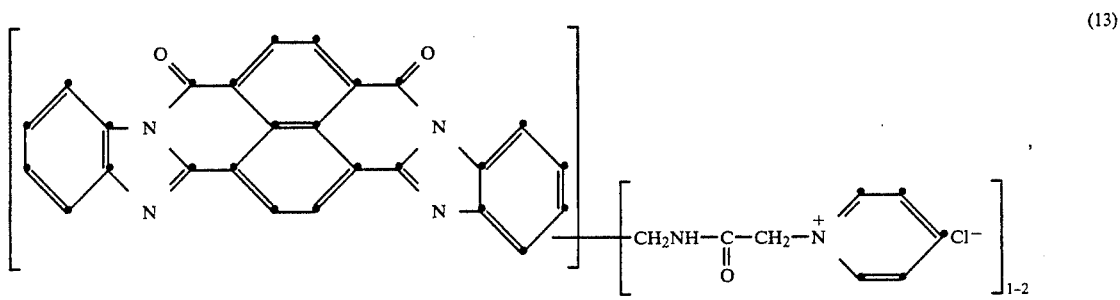
(13)
(14)

-continued
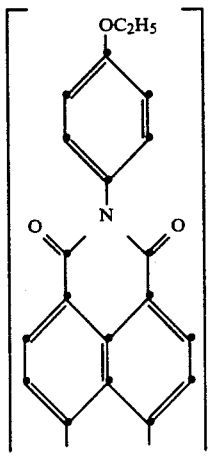
(15)
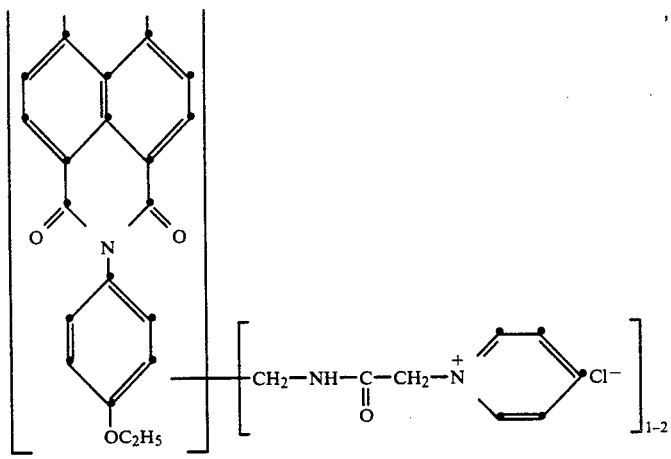
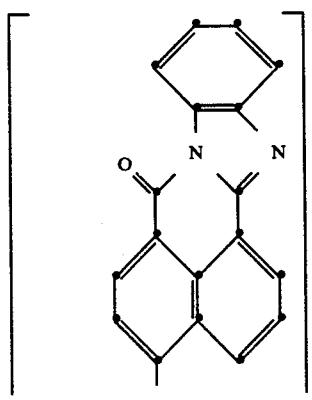
(16)

-continued

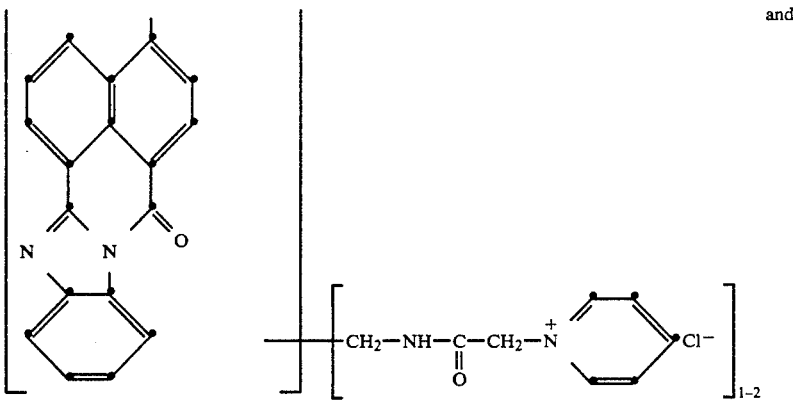

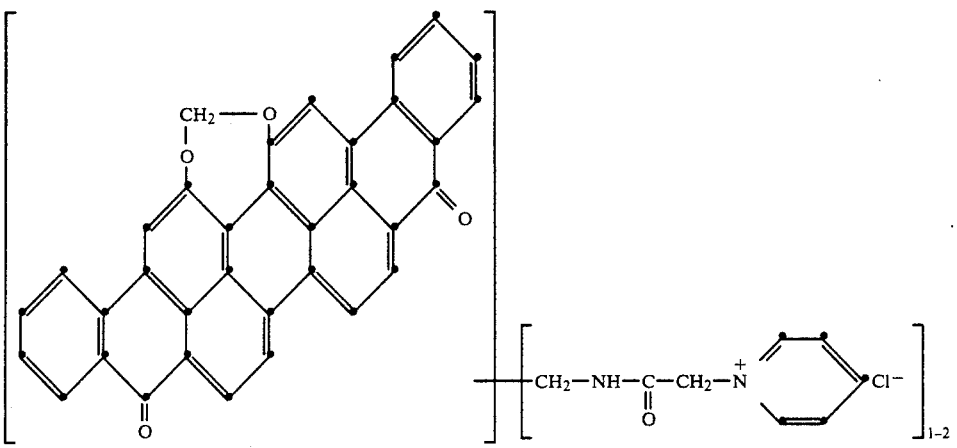

(17)

Another preferred sub-group of the dyes of the formula (1) are those in which $R_1$ is a substituted or unsubstituted $C_{1-4}$-alkyl radical, a substituted or unsubstituted cycloalkyl radical or a substituted or unsubstituted aryl radical and $R_2$ is hydrogen or a substituted or unsubstituted $C_{1-4}$-alkyl radical, or in which $R_1$ and $R_2$ together with the

group are a phthalimide radical, and F, $R_3$ and n are as defined under formula (1).

The dyes of the formula (1) in which $R_1$ is a substituted or unsubstituted $C_{1-4}$-alkyl radical, a substituted or unsubstituted cyclohexyl radical or a substituted or unsubstituted phenyl radical and $R_2$ is hydrogen, or in which $R_1$ and $R_2$ with the

group are a phthalimide radical, and $R_3$ and F are as defined under formula (1) and n is 1 or 2, are particularly preferred.

Especially preferred dyes of the formula (1) are those in which F is the radical of a dibenzanthrone, isodibenzanthrone or 16,17-methylenedioxydibenzanthrone dye, $R_1$ is a benzene, dichlorobenzene or cyclohexyl radical and $R_2$ and $R_3$ are hydrogen, or in which $R_1$ and $R_2$, together with the

group, are a phthalimide radical, and n is 1 or 2.

Valuable representatives of these preferred dyes are those of the formulae

Dyes of the formula

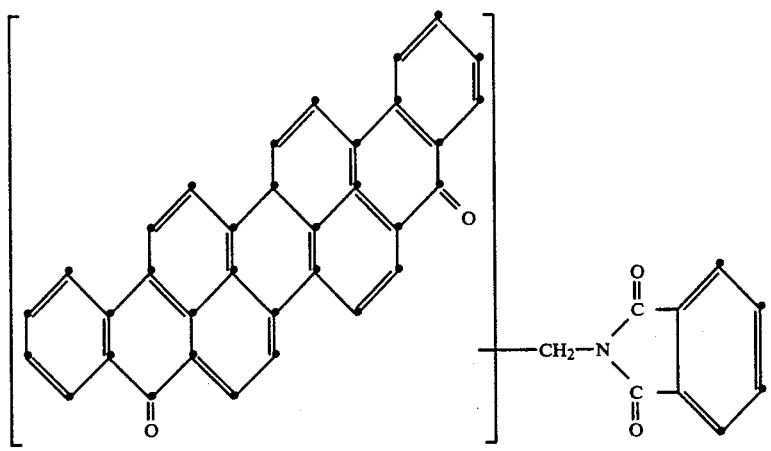
(18)

and

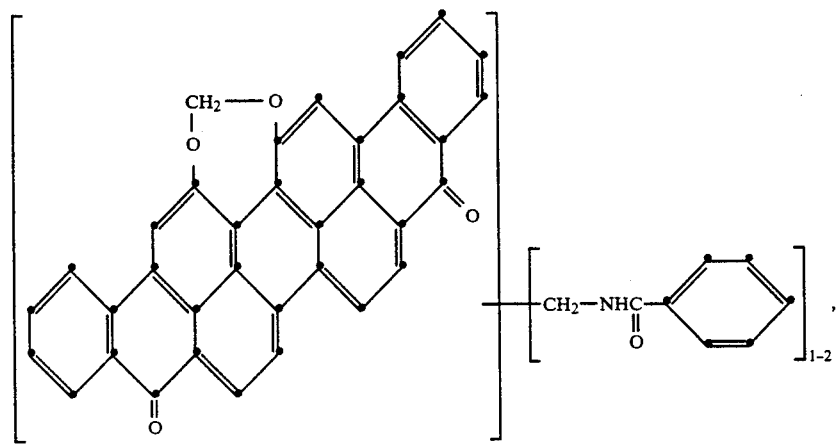
(19)

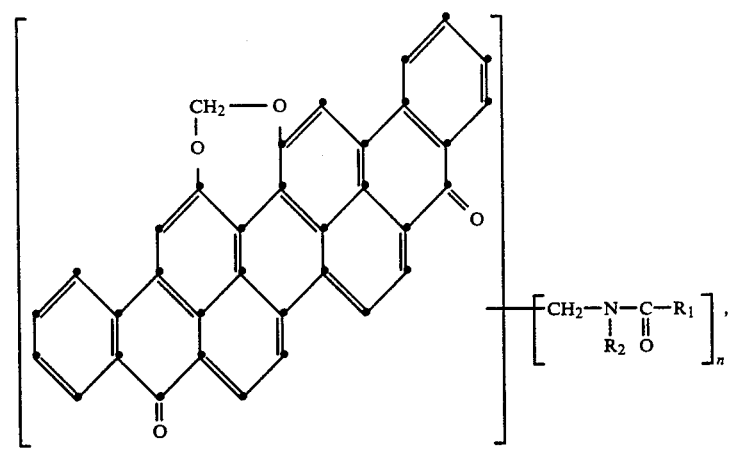
(30)

in which $R_1$, $R_2$ and n are as defined under formula (1), are also particularly preferred.

The invention also relates to dye mixtures which contain, as components, dyes of the formula

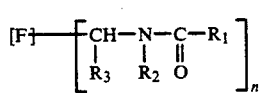
(1)

in which n in the individual components is independently 1, 2, 3 or 4 and F, $R_1$, $R_2$ and $R_3$ in the individual components are identical, and, where appropriate, a component of the formula $$F-H \qquad (20)$$

where the radical F in the formulae (1) and (20) is identical, and F, $R_1$, $R_2$ and $R_3$ in the formulae (1) and (20) are as defined under formula (1).

The dyes of the formula (1) are prepared by condensing a dye of the formula

F—H (20)

in which F is as defined under formula (1), with at least one equivalent of a compound of the formula

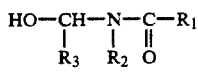 (21)

in which $R_1$ is a substituted or unsubstituted $C_{1-4}$-alkyl radical, a substituted or unsubstituted aryl radical, a substituted or unsubstituted cycloalkyl radical or a radical of the formula

—A—X (22)

in which A is a substituted or unsubstituted $C_{1-4}$-alkylene radical and X is a radical which can be converted into an anion, and $R_2$ and $R_3$ are as defined under formula (1), or in which $R_1$ and $R_2$, together with the

group, are a phthalimide radical, and, if $R_1$ is a radical of the formula (22), subsequently reacting the product with at least one equivalent of a compound of the formula

Q' (23)

in which Q' is a quaternisable basic compound, to give a dye of the formula (1).

A starting dye of the formula (20) in which F is the radical of an indanthrone, flavanthrone, anthraquinoneacridone, anthraquinonethioxanthone, thiophenbenzanthrone, anthraquinonecarbazole, pyranthrone, anthanthrone, dibenzopyrenequinone, isodibenzopyrenequinone, dibenzanthrone, isodibenzanthrone, perylenetetracarboxylic acid imide, naphthoylenebenzimidazole or naphthoquinone dye, a radical of an indigoid dye or a radical or a perinone or benzothioxanthene dye, the dye radicals being unsubstituted or substituted by halogen, alkyl, alkoxy, aryl, aryloxy, aralkyl, aralkoxy, arylamino, alkylthio, arylthio, alkylamino, cyano, thiocyano, hydroxy, acyl or acylamino, is preferably used.

A preferred preparation procedure comprises condensing a dye of the formula (20) in which F is as defined above with at least one equivalent of a compound of the formula

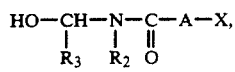 (24)

where $R_2$, $R_3$, A and X are as defined under formula (21) or (22), and subsequently reacting the product with at least one equivalent of a compound of the formula (23), in which Q' is as defined under formula (23).

After condensation of the dye of the formula (20) with a compound of the formula (24), the radical X can be converted into the corresponding halogen compound, if X is a radical other than halogen, by anion replacement by methods which are known per se.

Compounds which are preferably used as the quaternisable basic compound Q' of the formula (23) are those of the formula

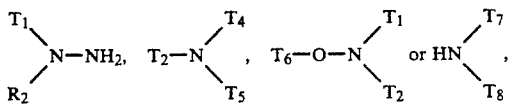

in which, in the formulae (25) to (28), $T_1$, $T_2$, $T_3$, $T_4$ and $T_8$ independently of one another are $C_{1-4}$-alkyl radicals which are unsubstituted or substituted by hydroxyl, $T_5$ and $T_6$ independently of one another are $C_{1-4}$-alkyl radicals, $T_7$ is hydrogen, a $C_{1-4}$-alkyl radical which is unsubstituted or substituted by hydroxyl, a cyclohexyl radical which is unsubstituted or mono-, di- or tri-substituted by methyl groups, or a phenyl radical, or in which the radicals $T_1$ and $T_2$, $T_3$ and $T_4$, or $T_7$ and $T_8$, together with the nitrogen atom, are a pyrrolidine, piperidine, morpholine or piperazine ring, or in which the radicals $T_3$, $T_4$ and $T_5$, together with the nitrogen atom, are a pyridine ring or a radical of the formula

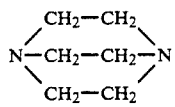 (29)

A particularly preferred preparation procedure comprises condensing a dye of the formula (20), in which F is as defined above, with at least one equivalent of a compound of the formula (24), in which $R_2$ is hydrogen or a $C_{1-4}$-alkyl radical which is unsubstituted or substituted by chlorine, $R_3$ is hydrogen, a $C_{1-4}$-alkyl radical which is unsubstituted or substituted by chlorine, or a substituted or unsubstituted phenyl radical, and A and X are as defined under formula (22), and subsequently reacting the product with at least one equivalent of a compound of the formula (25), (26), (27), (28) or (29).

An especially preferred preparation procedure comprises condensing a dye of the formula (20) in which F is a radical of a dibenzanthrone, isodibenzanthrone, 16,17-ethylenedioxydibenzanthrone, 2,2'-dibenzanthronyl, 2,2'-bisindolindigo, 2,2'-bisthionaphtheneindigo, cis- or trans-naphathoylenebenzimidazole, benzothioxanthene, N,N'-di-p-tolyl-perylenetetracarboxylic acid-diimide, N,N'-di-p-phenethoxy-naphthalene-1,4,5,8-tetracarboxylic acid-diimide, 5,5'-bis-naphthyl-1,1',8,8'-tetracarboxylic acid-dibenzimidazole, 5,5'-bisnaphthyl-1,1',8,8'-tetracarboxylic acid-6'',6'''-dimethyldibenzimidazole, 5,5'-bisnaphthyl-1,1',8,8'-tetracarboxylic acid-5'',5''',6'',6'''-tetramethoxydibenzimidazole or 16,17-dihydroxy-or-dimethoxy-dibenzanthrone dye or a radical of the formula

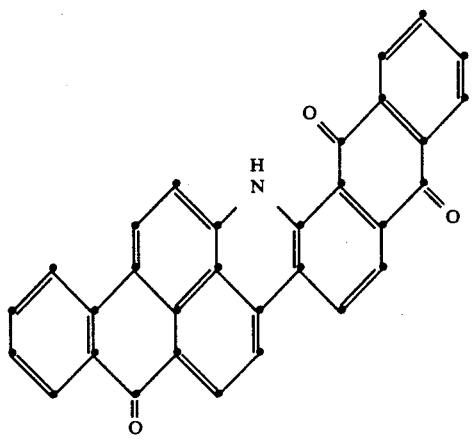

(8)

or

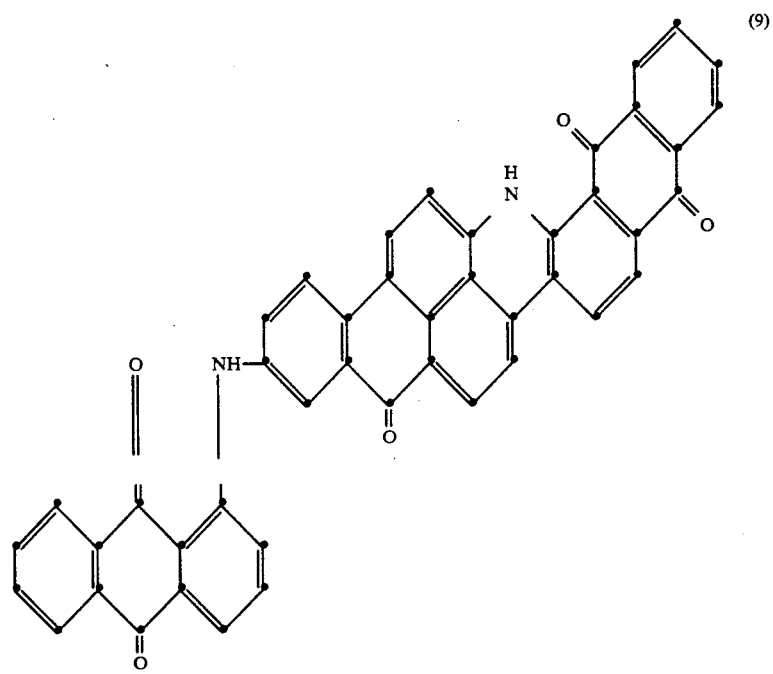

(9)

with at least one equivalent of a compound of the formula (24) in which $R_2$ and $R_3$ are hydrogen, A is methylene and X is chlorine, and subsequently reacting the product with at least one equivalent of a compound of the formula (23) in which Q' is pyridine.

The preparation of the preferred dyes of the formulae (10), (11), (12), (13), (14), (15), (16) and (17) comprises a) condensing dibenzanthrone with N-methylolchloroacetamide and reacting the product with pyridine to give a dye of the formula (10);

b) condensing 16,17-ethylenedioxydibenzanthrone with N-methylolchloroacetamide and subsequently reacting the product with pyridine to give a dye of the formula (11);

c) condensing trans-naphthoylenebenximidazole with N-methylolchloroacetamide and subsequently reacting the product with pyridine to give a dye of the formula (12);

d) condensing cis-naphthoylenebenzimidazole with N-methylolchloroacetamide and subsequently reacting the product with pyridine to give a dye of the formula (13);

e) condensing N,N'-di-p-tolyl-perylenetetracarboxylic acid diimide with N-methylolchloroacetamide and subsequently reacting the product with pyridine to give a dye of the formula (14);

f) condensing N,N'-di-p-phenethoxynaphthalene-1,4,5,8-tetracarboxylic acid diimide with N-methylolchloroacetamide and subsequently reacting the product with pyridine to give a dye of the formula (15);

g) condensing 5,5'-bis-naphthyl-1,1',8,8'-tetracarboxylic acid-dibenzimidazole with N-methylolchloroacetamide and subsequently reacting the product with pyridine to give a dye of the formula (16); or h) condensing 16,17-dihydroxydibenzanthrone with N-methylolchloroacetamide and subsequently reacting the product with pyridine to give a dye of the formula (17).

Another important preparation procedure comprises condensing a dye of the formula (20) in which F is as defined under formula (20) with at least one equivalent of a compound of the formula

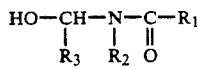  (21)

in which $R_1$ is a substituted or unsubstituted $C_{1-4}$-alkyl radical, a substituted or unsubstituted cycloalkyl radical or a substituted or unsubstituted aryl radical and $R_2$ is hydrogen or a substituted or unsubstituted $C_{1-4}$-alkyl radical, or in which $R_1$ and $R_2$, together with the

group, are a phthalimide radical, $R_3$ is hydrogen, a substituted or unsubstituted $C_{1-4}$-alkyl radical, a substituted or unsubstituted aryl radical, a $C_{1-4}$-alkoxycarbonyl radical or a N,N-di-$C_{1-4}$-alkylcarboxamide radical, to give a dye of the formula (1).

A preferred preparation procedure comprises condensing a dye of the formula (20) in which F is as defined under formula (20) with at least one equivalent of a compound of the formula (21), in which $R_1$ is a substituted or unsubstituted $C_{1-4}$-alkyl radical, a substituted or unsubstituted cyclohexyl radical or a substituted or unsubstituted phenyl radical and $R_2$ is hydrogen, or in which $R_1$ and $R_2$, together with the

group, are a phthalimide radical, and $R_3$ is as defined under formula (21).

A particularly preferred preparation procedure comprises condensing, as the dye of the formula (20), a dibenzanthrone, isodibenzanthrone or 16,17-dihydroxydibenzanthrone dye with at least one equivalent of a compound of the formula (21), in which $R_1$ is a benzene, dichlorobenzene or cyclohexyl radical and $R_2$ and $R_3$ are hydrogen, or in which $R_1$ and $R_2$, together with the

group, are a phthalimide radical.

The preparation of the preferred dyes of the formulae (18) and (19) comprises
a) reacting dibenzanthrone with N-methylolphthalimide to give a dye of the formula (18), and
b) reacting 16,17-dihydroxydibenzanthrone with N-methylolbenzamide to give a dye of the formula (19).

Another preferred process for the preparation of dyes of the formula

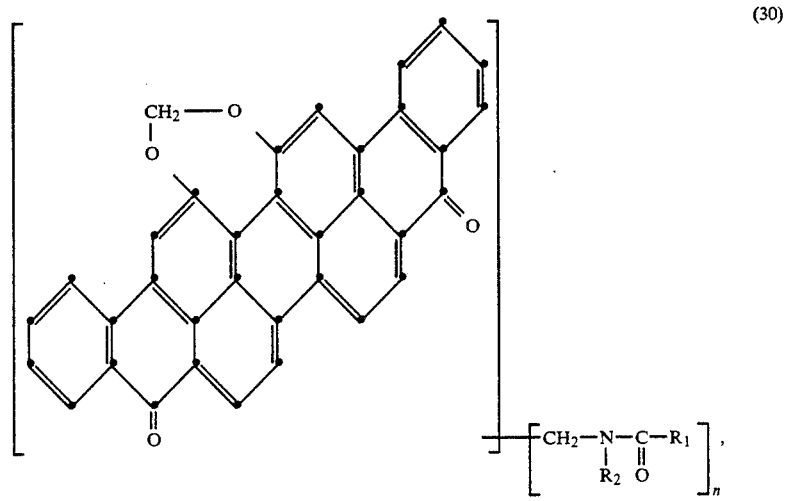  (30)

in which $R_1$, $R_2$ and n are as defined under formula (1), comprises condensing a 16,17-dihydroxy-or-dialkoxy-dibenzanthrone with at least two equivalents of a compound of the formula (21) in which $R_3$ is hydrogen and $R_1$ and $R_2$ are as defined under formula (21), and, if $R_1$ is a radical of the formula (22), subsequently reacting the product with at least one equivalent of a compound of the formula (23).

In this preferred preparation procedure, the 16,17-dihydroxy- or -dialkoxy-dibenzanthrone is amidomethylated by one equivalent of the compound of the formula (21) and the product undergoes substitution, with simultaneous cyclisation, with the second equivalent of the compound of the formula (21) to give a dye of the formula (30).

The preparation of the dye mixtures which contain, as components, dyes of the formula (1) in which n in the individual components is independently 1, 2, 3 or 4 and F, $R_1$, $R_2$ and $R_3$ in the individual components are identical, and, where appropriate, a component of the formula (20), where the radical F in the formulae (1) and (20) is identical, comprises condensing a dye of the formula (20) in which F is as defined under formula (20) with a compound of the formula (21) in which $R_1$, $R_2$ and $R_3$ are as defined under formula (21), and, if $R_1$ is a radical of the formula (22), subsequently reacting the mixture of products with a compound of the formula (23).

The condensation of a dye of the formula (20) with a compound of the formula (21) is a Tscherniac-Einhorn condensation, which is carried out in the presence of acid condensing agents, for example concentrated sulfuric acid, at a low temperature.

If the radical $R_1$ in formula (21) is a radical of the formula (22), the condensation product can be further reacted with a basic compound, for example a tertiary amine, at a low to slightly elevated temperature.

Examples of starting compounds of the formula (20) are: dibenzanthrone, isodibenzanthrone, 16,17-ethylenedioxydibenzanthrone, 16,17-dihydroxydibenzanthrone, 16,17-dimethoxydibenzanthrone, 2,2'-dibenzanthronyl, 2,2'-bisindoleindigo, 2,2'-bisthionaphtheneindigo, cis-naphthoylenebenzimidazole, trans-naphthoylenebenzimidazole, benzothioxanthene, N,N'-di-p-tolylperylenetetracarboxylic acid diimide, N,N'-di-p-phenethoxynaphthalene-1,4,5,8-tetracarboxylic acid diimide, 5,5'-bis-naphthyl-1,1',8,8'-tetracarboxylic acid-dibenzimidazole, 5,5'-bis-naphthyl-1,1',8,8'-tetracarboxylic acid-6'',6'''-dimethyldibenzimidazole, 5,5'-bis-naphthyl-1,1',8,8'-tetracarboxylic acid-5'',5''',6'',6'''-tetramethoxydibenzimidazole and compounds of the formulae propyl)-propionamide, N-($\beta$-chloro-$\alpha$-hydroxyethyl)-acetamide, N-methylolphthalimide, N-methyloldichlorobenzamide, N-methylolbenzamide, N-methylolcyclohexamide, N-methyl-3-chloropropionamide and N-phenyl-N-methylolchloroacetamide.

Examples of starting compounds of the formula (23) are: N,N-dimethylhydrazine, triethylamine, dibutylamine, N-propyl-N-cyclohexylamine, pyrrolidine, piperidine, morpholine, piperazine, pyridine and triethylenediamine.

The dyes of the formula (1) obtained according to the invention can be separated out of the reaction mixture in a manner which is known per se.

The vat dyes of the formula (1) are suitable for dyeing and printing a great variety of materials, in particular for dyeing and printing fibres of natural or regenerated cellulose in the presence of reducing agents, for example dithionite.

The novel basic compounds of the formula (1), which

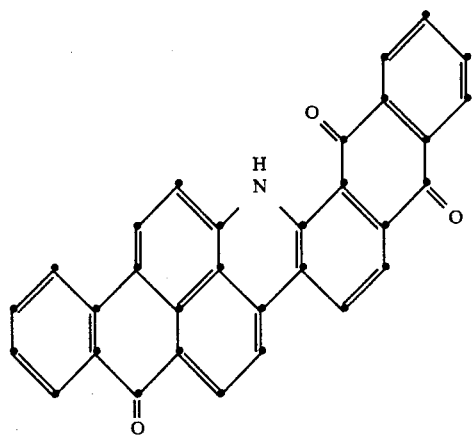

(8)

and

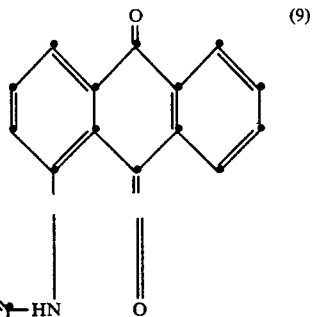

(9)

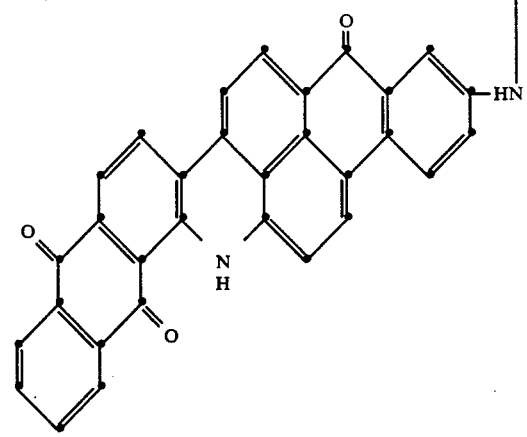

Examples of starting compounds of the formula (21) are: N-methylolacetamide, N-methylolchloroacetamide, N-methyl-N-methylolacetamide, N-($\alpha$-hydroxymay be quaternised, are used as dyes for dyeing and/or printing textile materials, paper and leather.

Where the novel dyes are used for dyeing and/or printing textile materials, the materials used are wool, silk and acid-modified polyamide materials, as well as polyacrylonitrile materials (for example wet tow), and modified polyester material which can be dyed with basic dyes, and furthermore natural and regenerated cellulose materials such as cotton and viscose, dyeings with a good build-up of the dye being obtained. The resulting dyeings have good fastness properties, especially wet-fastness properties, such as fastness to washing, and light-fastness properties. A further advantage is that the compounds of the formula (1) according to the invention are absorbed onto these cellulose materials without pretreatment of the materials and without the additional presence of salt in the dye liquor.

The compounds of the formula (1) according to the invention are preferably used for dyeing paper of all types, in particular bleached, unsized and sized lignin-free paper. These compounds are very particularly suitable for dyeing unsized paper (tissue-paper) as a result of their very high standard affinity for this substrate.

The compounds according to the invention are absorbed very well on these substrates, the effluents remaining colourless, even in the case of deep shades (to more than 1/1 SD=standard depth shade), which is an eminent technical and ecological advantage, especially in view of the present effluent laws. The high degree of exhaustion is also advantageous from the point of view of reproducibility of the shade. The degree of exhaustion is virtually unaffected by the hardness of the water. The dyeings on paper are fast to light and fast to wet processing, i.e. they show no tendency to bleed if wet dyed paper is brought into contact with moist white paper. This property is particularly desirable for so-called "tissue-paper", with which it is foreseeable that the wet dyed paper (for example impregnated with water, alcohol, surfactant solution and the like) is brought into contact with other sheet-like structures, such as textiles, paper and the like, which must be protected from soiling.

The high affinity for paper and the high rate of exhaustion of the dyes according to the invention is of advantage in continuous dyeing of paper, and thus enables them to have a very broad field of use.

In the following examples, unless stated otherwise, parts and percentages are by weight, and the temperatures are given in degrees Centigrade. Parts by weight bear the same relation to parts by volume as that of the gram to the millilitre.

EXAMPLE 1

A mixture of 46 parts of the dye base of the formula

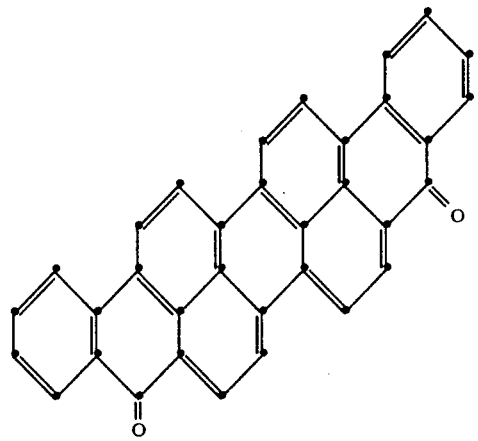

and 30 parts of N-methylolchloroacetamide are dissolved in 500 parts of 100% sulfuric acid. The mixture is then stirred at 50° for 15 hours. The solution is subsequently poured onto ice, after which the reaction product precipitates and is filtered off and washed neutral with water. After drying, 50 parts of the compound of the formula

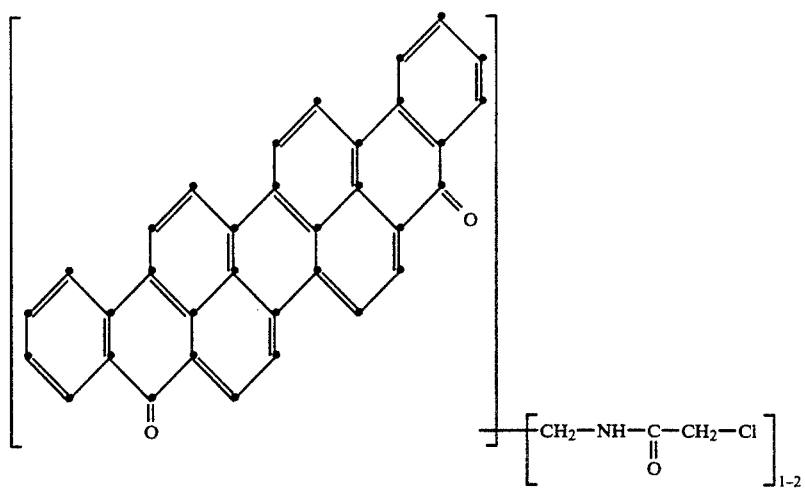

are obtained. 30 parts of the condensation product thus obtained are introduced into 200 parts of pyridine and the mixture is warmed at 100° for 1 hour.

The cationic compound of the formula

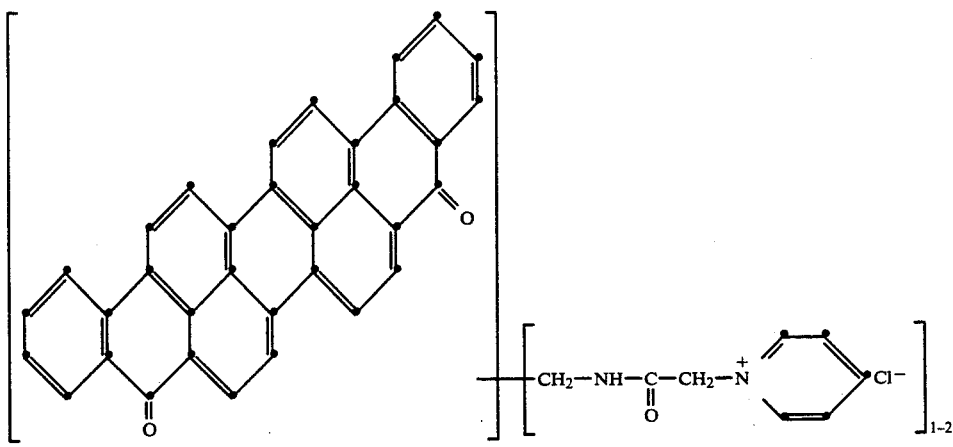

is filtered off with suction and dried.

The dyestuff displays a very good affinity for paper and cotton. The reddish-tinged blue dyeings have very good wet-fastness properties and good fastness to light.

The procedure described is repeated, using corresponding parts of the dye bases listed in Table 1 instead of dibenzanthrone as the dye base. Dyestuffs with similarly good properties are obtained.

TABLE 1

| Example | Parts | Dye base | Colour shade on paper |
|---|---|---|---|
| 2 | 52 | | greenish-tinged blue |
| 3 | 46 | | reddish-tinged blue |

TABLE 1-continued
| Example | Parts | Dye base | Colour shade on paper |
|---|---|---|---|
| 4 | 45 | 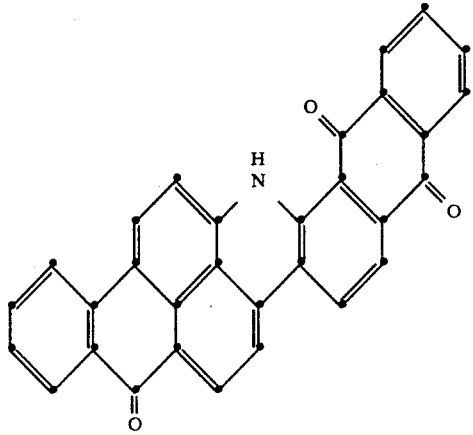 | olive |
| 5 | 67 | 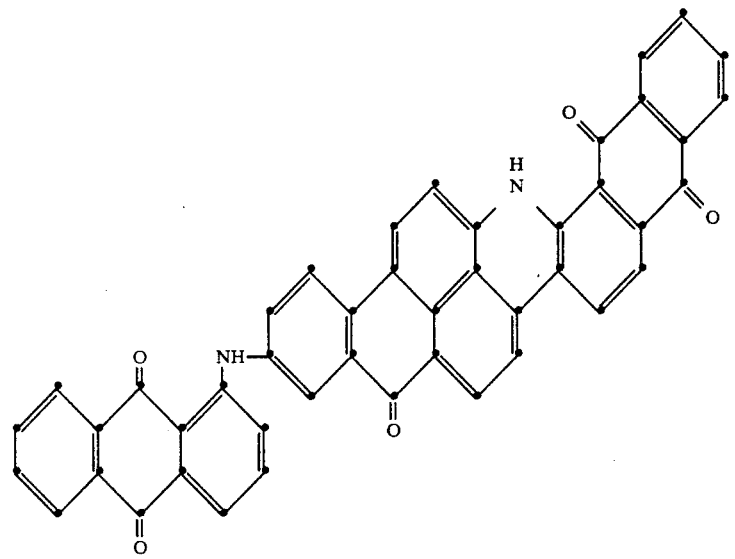 | olive |
| 6 | 46 | 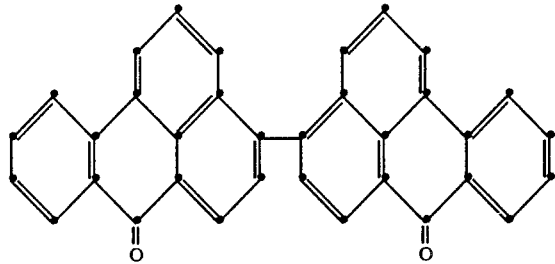 | yellowish-tinged green |
| 7 | 26 | 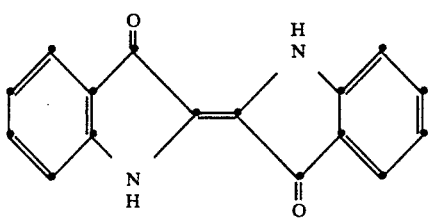 | greenish-tinged blue |

TABLE 1-continued
| Example | Parts | Dye base | Colour shade on paper |
|---|---|---|---|
| 8 | 30 | 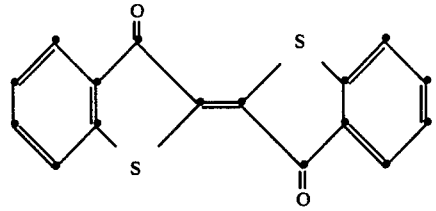 | bluish-tinged red |
| 9 | 41 | 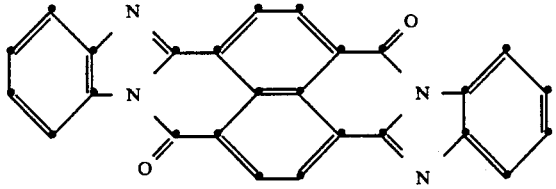 | orange |
| 10 | 41 | 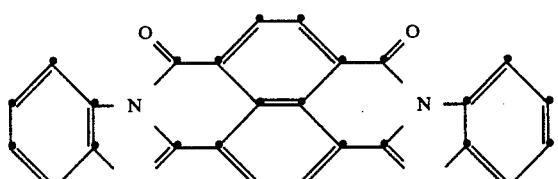 | red |
| 11 | 49 | 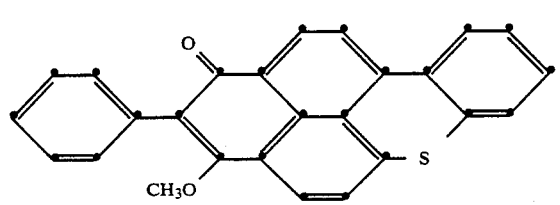 | red |
| 12 | 57 | 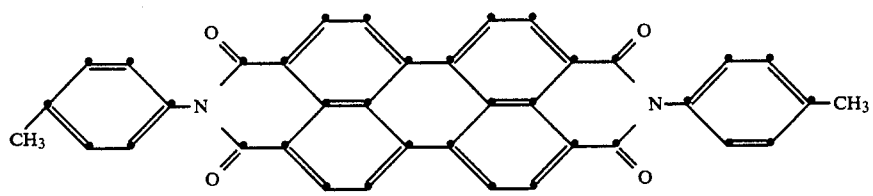 | red |
| 13 | 63 | 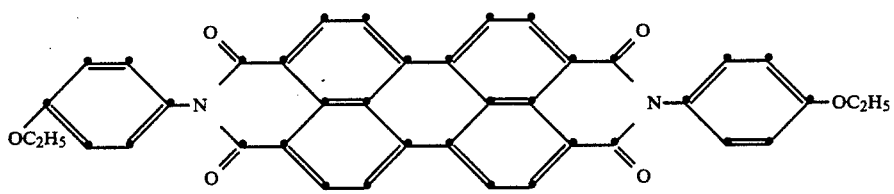 | red |
| 14 | 54 | 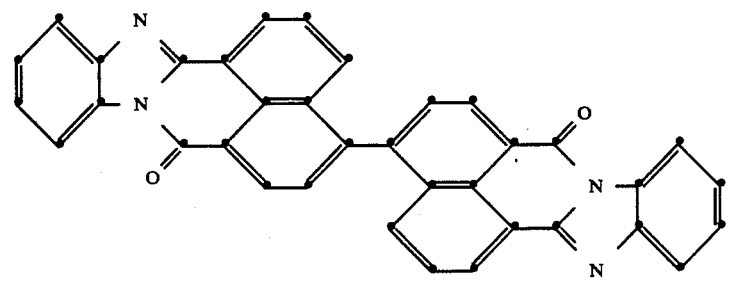 | yellow |

TABLE 1-continued

| Example | Parts | Dye base | Colour shade on paper |
|---|---|---|---|
| 15 | 56 | 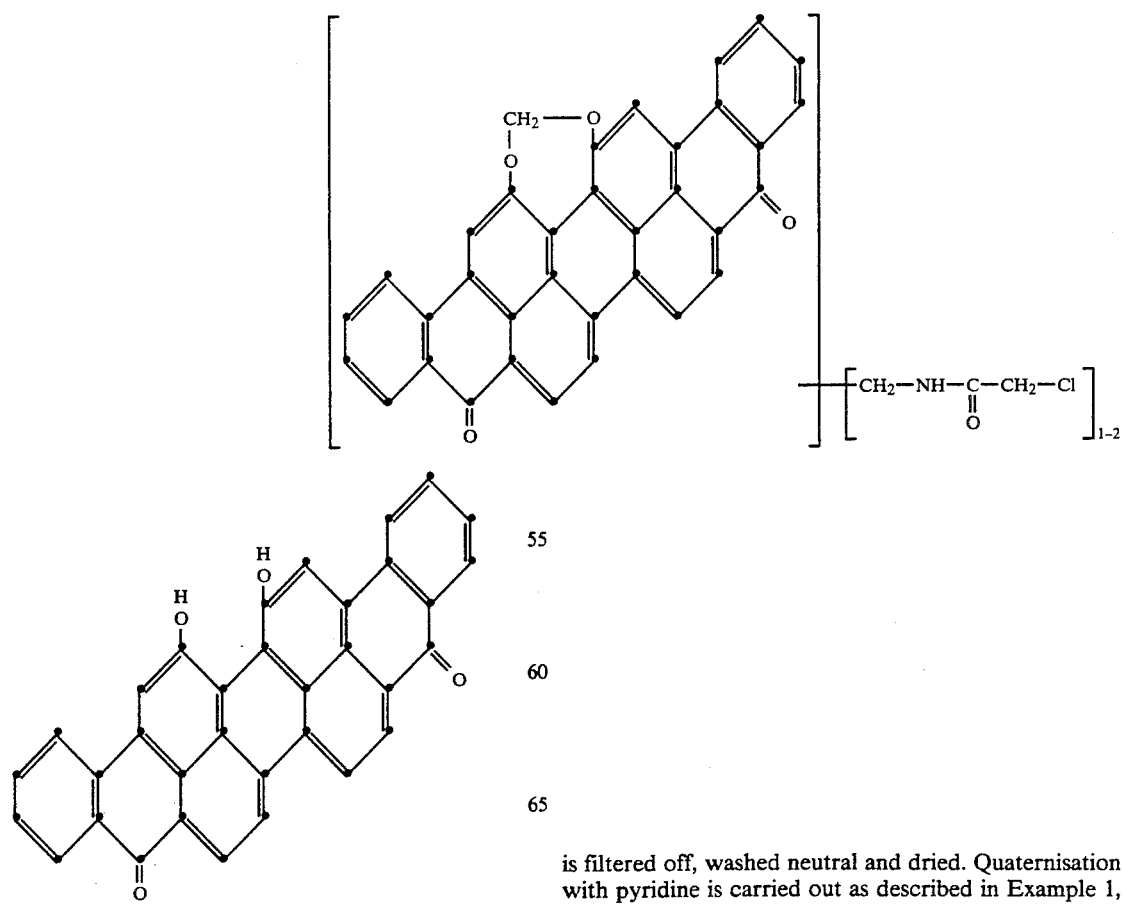 | yellow |
| 16 | 76 | | orange |

EXAMPLE 17

49 parts of the dye base of the formula are mixed with 30 parts of N-methylolchloroacetamide and the mixture is introduced into 500 parts of 100% sulfuric acid. The mixture is stirred at 50° for 15 hours and is then poured onto ice. The precipitated product of the formula is filtered off, washed neutral and dried. Quaternisation with pyridine is carried out as described in Example 1, to give the cationic dye of the formula

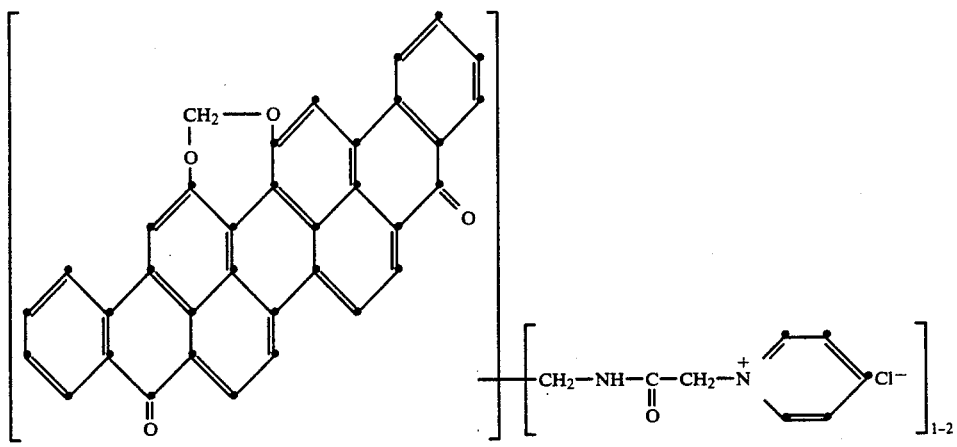

which gives a reddish-tinged blue shade with good light-fastness and wet-fastness properties when used for dyeing paper or cotton.

The procedure described is repeated, using, under identical conditions, 52 parts of the dye base of the formula

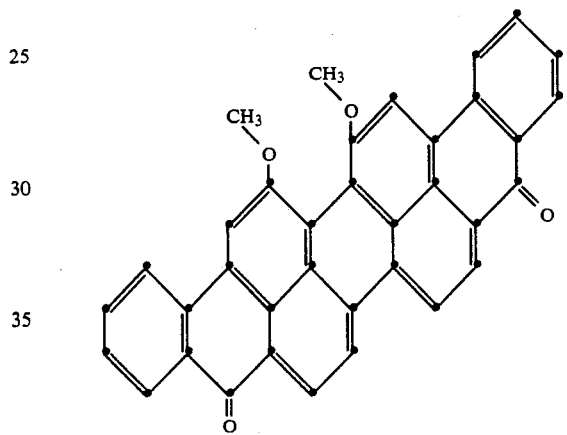

as the dye base instead of 16,17-dihydroxydibenzanthrone. The cationic compound of the formula

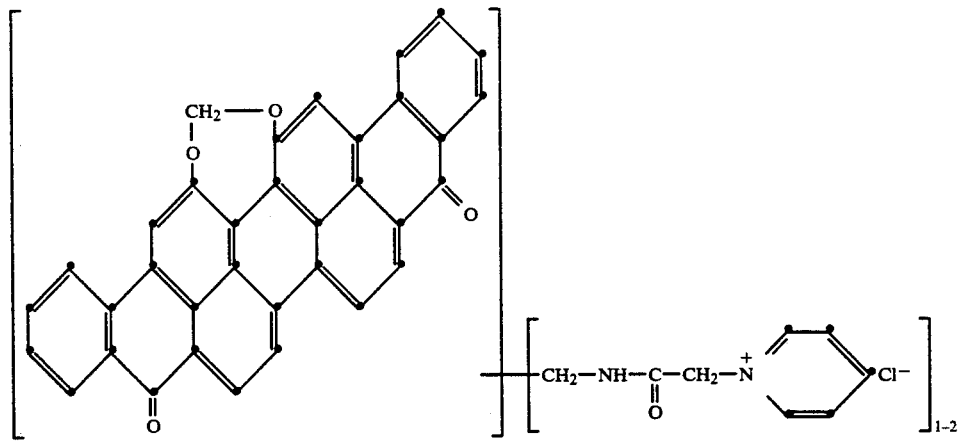

which has equally good properties on paper and on cotton, is obtained.

EXAMPLE 18

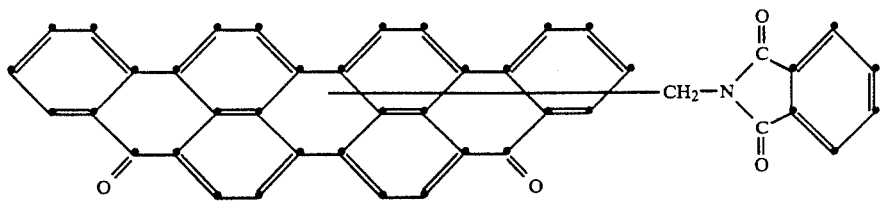

100 parts of sulfuric acid monohydrate are taken at room temperature and 9.1 parts of dibenzanthrone are added such that the temperature does not rise above 30° C. (about 5 minutes).

3.9 parts of N-methylolphthalimide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 12.5 parts
Shade: violet
Analysis: N=2.5%

EXAMPLE 19

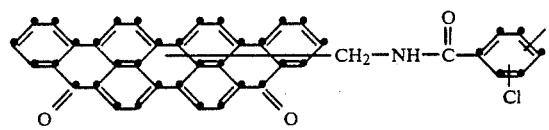

100 parts of sulfuric acid monohydrate are taken at room temperature and 9.1 parts of dibenzanthrone are added such that the temperature does not rise above 30° C. (about 5 minutes).

5 parts of N-methyloldichlorobenzamide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 12.8 parts
Shade: dark blue
Analysis: N=1.9%; Cl=10.8%

EXAMPLE 20

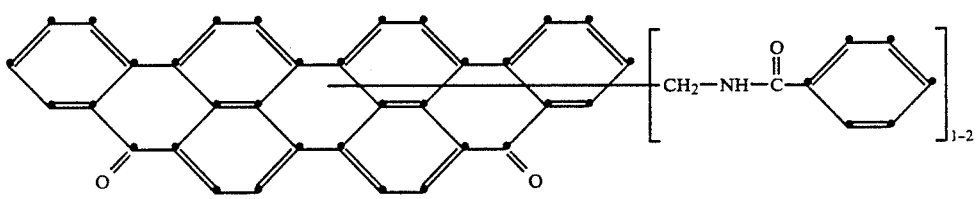

100 parts of sulfuric acid monohydrate are taken at room temperature and 9.1 parts of dibenzanthrone are added such that the temperature does not rise above 30° C. (about 5 minutes).

8 parts of N-methylolbenzamide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 12 parts
Shade: dark blue
Analysis: N=2.8%.

EXAMPLE 21

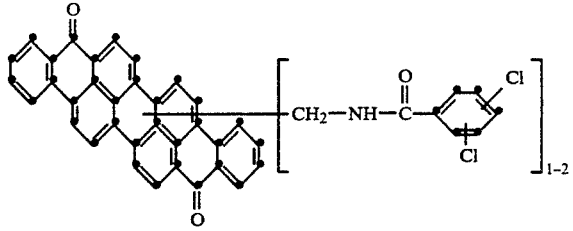

100 parts of sulfuric acid monohydrate are taken at room temperature and 9.1 parts of isoviolanthrone are added such that the temperature does not rise above 30° C. (about 5 minutes).

12 parts of N-methyloldichlorobenzamide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 15 parts
Shade: violet
Analysis: N=2.7%; Cl=16.0%

EXAMPLE 22

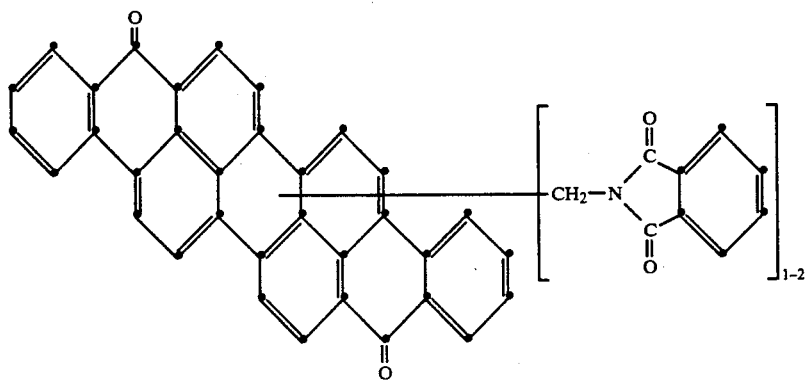

100 parts of sulfuric acid monohydrate are taken at room temperature and 9.1 parts of isoviolanthrone are added such that the temperature does not rise above 30° C. (about 5 minutes).

9 parts of N-methylolphthalimide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 16 parts
Shade: violet
Analysis: N=4.0%.

EXAMPLE 23

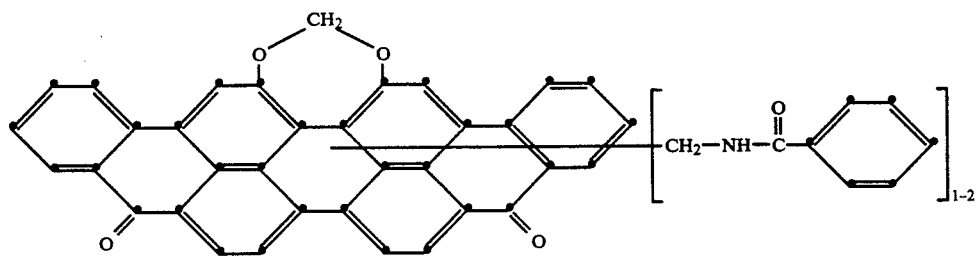

300 parts of sulfuric acid monohydrate are taken at room temperature and 29.4 parts of dihydroxyviolanthrone are added such that the temperature does not rise above 30° C. (about 5 minutes).

20 parts of N-methylolbenzamide are then added such that the temperature does not rise above 35° C. (about 10 minutes).

The resulting suspension is stirred for a further 8 hours at 35° to 40° C. and is then poured onto about 500 parts of an ice-water mixture. The precipitated product is filtered off and washed neutral with water.

The material on the filter is dried overnight in a vacuum drying cabinet at 80° C.
Yield: 38 parts
Shape: navy blue
Analysis: N=2.4%

EXAMPLE 24

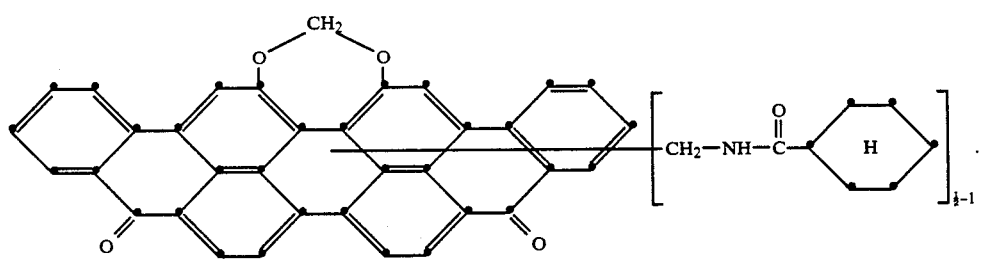

100 parts of sulfuric acid monohydrate are taken at room temperature and 9.8 parts of dihydroxyviolanthrone are added such that the temperature does not rise above 30° C. (about 5 minutes).

9 parts of N-methylolcyclohexamide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 12 parts
Shade: navy blue
Analysis: N=1.6%.

EXAMPLE 25

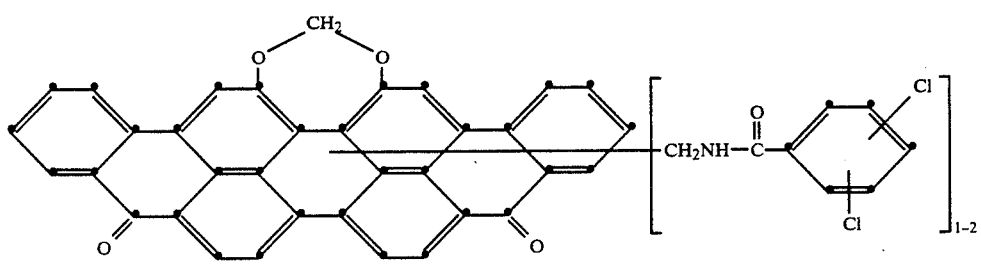

100 parts of sulfuric acid monohydrate are taken at room temperature and 9.8 parts of dihydroxyviolanthrone are added such that the temperature does not rise above 30° C. (about 5 minutes).

12 parts of N-methyloldichlorobenzamide are then added such that the temperature does not rise above 35° C. (about 10 minutes).

The resulting suspension is stirred for a further 8 hours at 35° to 40° C. and is then poured onto about 200 parts of an ice-water mixture. The precipitated product is filtered off and washed neutral with water.

The material on the filter is dried overnight in a vacuum drying cabinet at 80° C.
Yield: 15.2 parts
Shade: navy blue
Analysis: N=2.6%; Cl=15.0%

APPLICATION EXAMPLE 5 parts of paper (unsized, 50% bleached sulfite RKN 15 and 50% bleached beech-sulfite, Schopper-Riegler freeness of 21°) are suspended in 200 parts of water (10° German hardness, pH 6) in a stainless steel beaker. 0.1 part of the cationic dye of Example 2 is added. After the mixture has been stirred at 22° for 20 minutes, another 1,800 parts of water are added. A sheet of paper which is dyed deep-blue and has good fastness to light is then produced in a "Frank" sheeter. The dyed sheet of paper is resistant to leaching with water, water/alcohol (50:50) and surfactant solutions, the effluent remaining colourless.

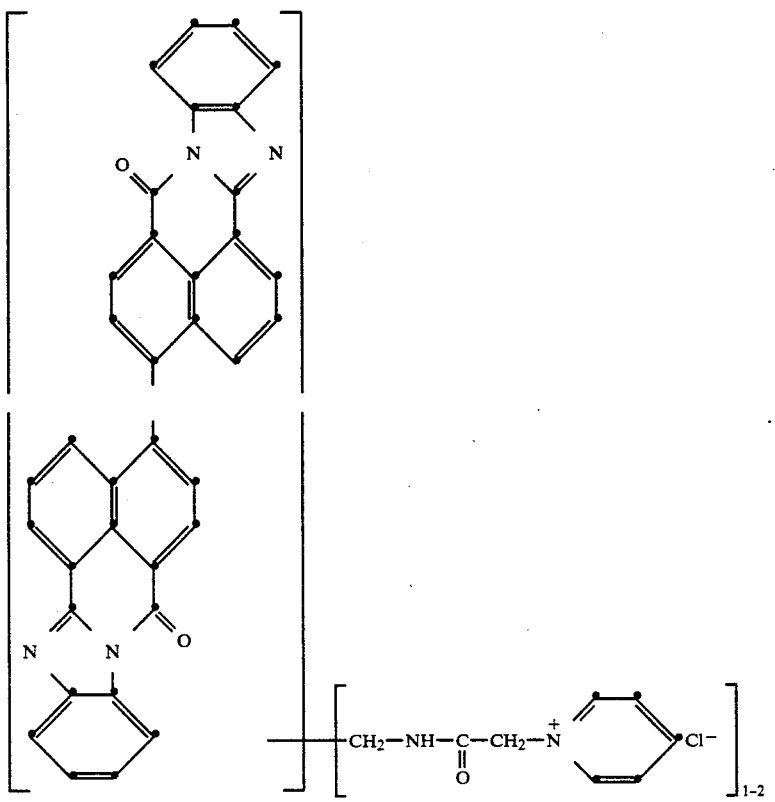
9. The dye according to claim 1, of the formula
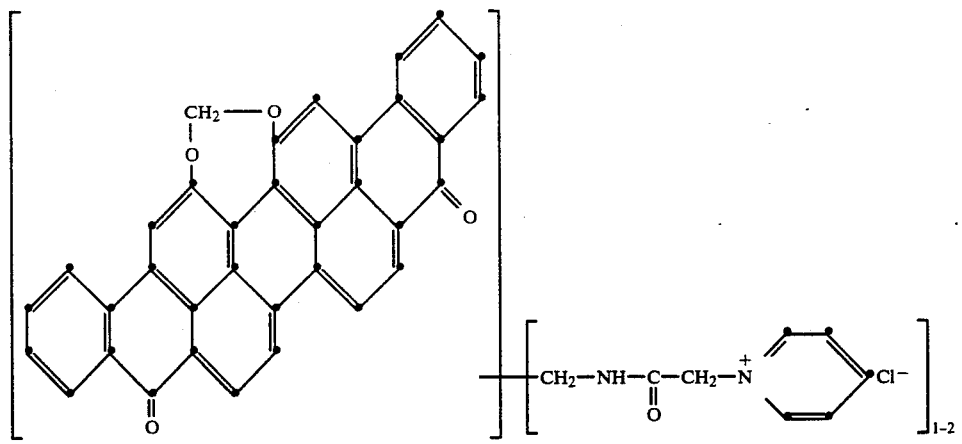

What is claimed is:

1. A dye of the formula

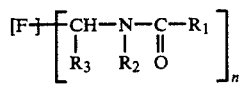

in which F is a group of a dibenzanthrone, isodibenzanthrone, 16,17-ethylenedioxydibenzanthrone, 2,2'-dibenzanthronyl, 2,2'-bisindolindigo, 2,2'-bisthionaphthenein-digo, cis- or trans-naphthoylenebenzimidazole, benzothioxanthene, N,N'-di-p-tolyl-perylenetetracarboxylic acid diimide, N,N'-di-p-phenethoxynaphthalene-1,4,5,8-tetracarboxylic acid diimide, 5,5'-bisnaphthyl-1,1',8,8'-tetracarboxylic acid-dibenzimidazole, 5,5'-bis-naphthyl-1,1',8,8'-tetracarboxylic acid-6",6'''-dimethyldibenzimidazole, 5,5'-bisnaphthyl-1,1',8,8'-tetracarboxylic acid-5",5''',6",6'''-tetramethoxydibenzimidazole or 16,17-methylenedioxydibenzanthrone dye, or a group of a compound of the formula

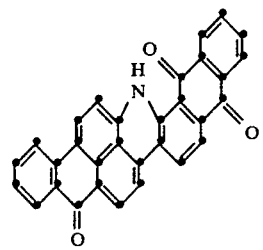

or

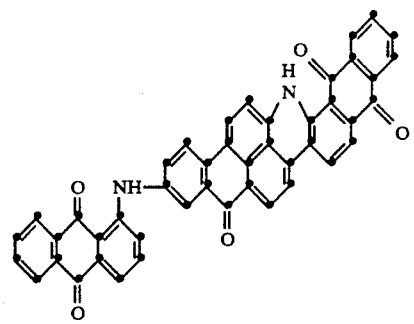

$R_1$ is a group of the formula —A—Q wherein A is methylene and Q is

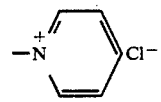

n is 1 or 2, and $R_2$ and $R_3$ are hydrogen.

2. A dye according to claim 1, of the formula

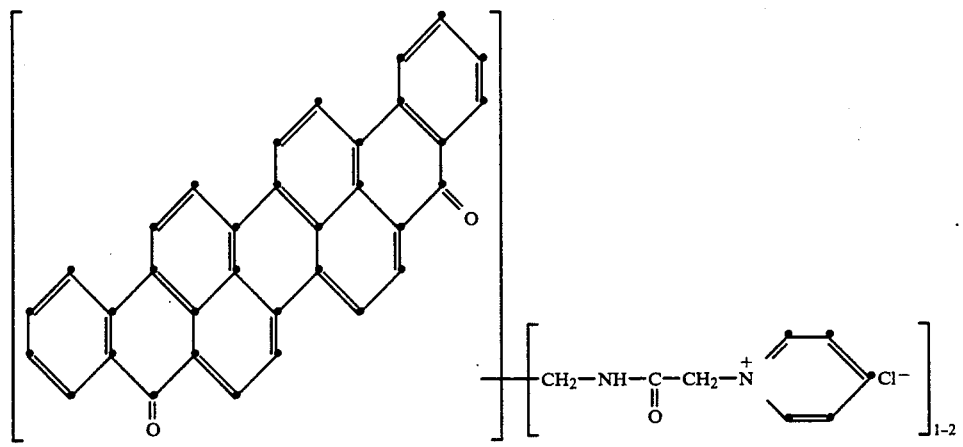
3. A dye according to claim 1, of the formula
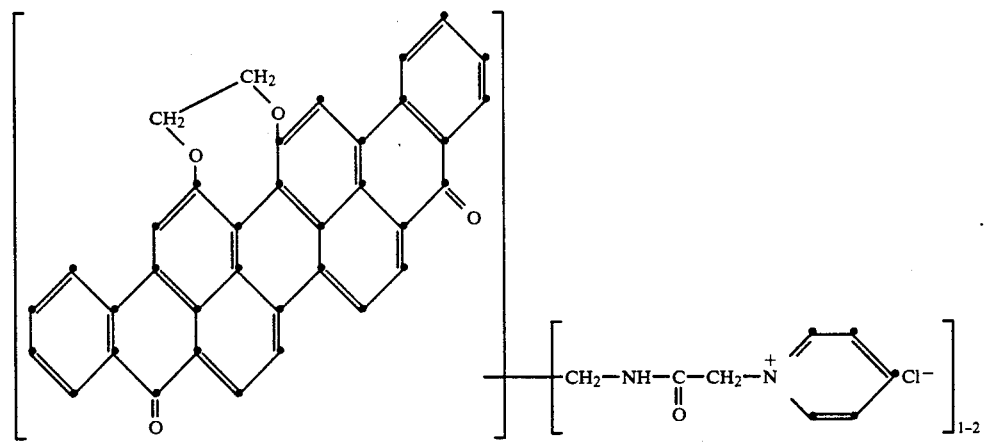
4. A dye according to claim 1, of the formula
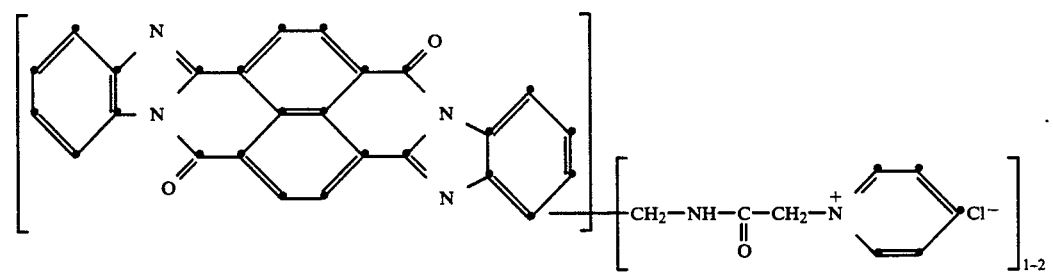
5. The dye according to claim 1, of the formula

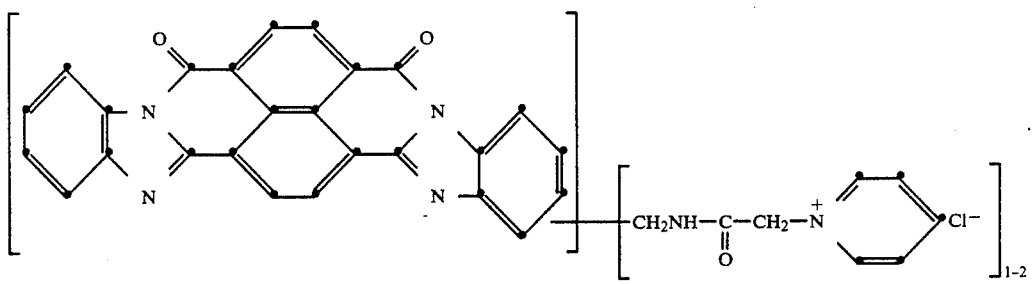
6. The dye according to claim 1, of the formula
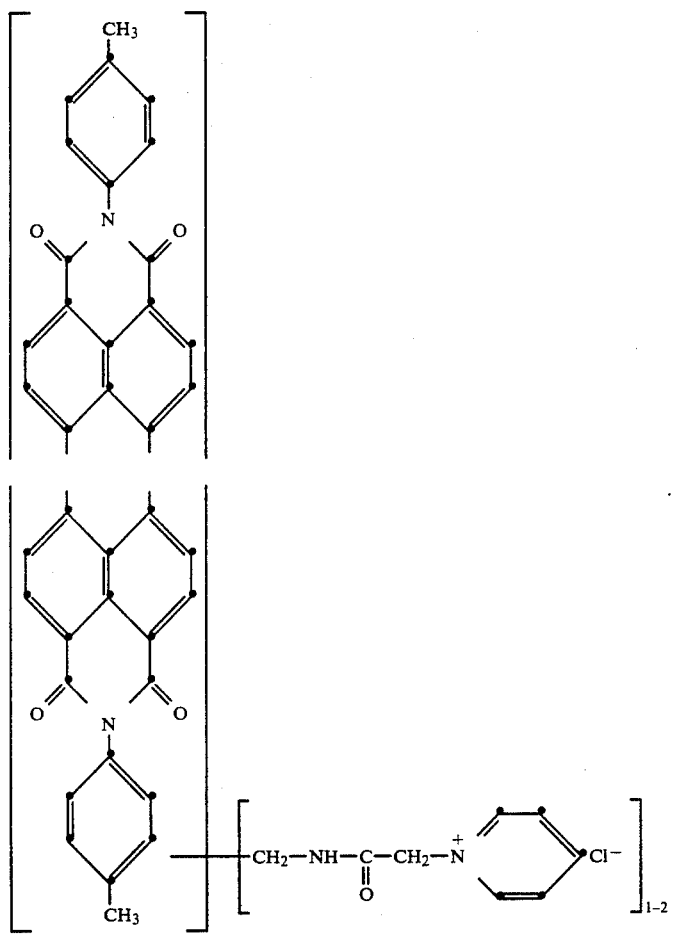
7. The dye according to claim 1, of the formula
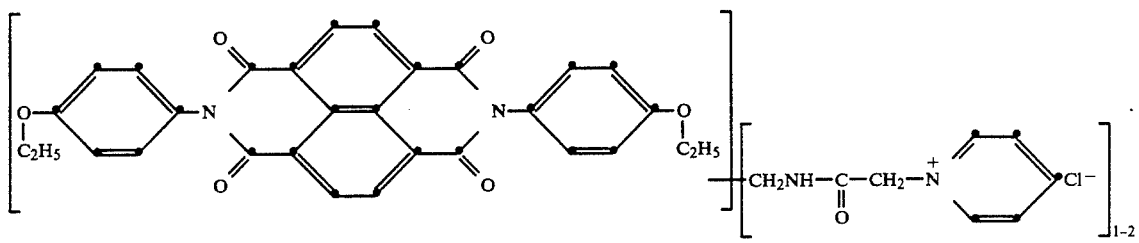
8. The dye according to claim 1, of the formula